United States Patent
Khaira et al.

(10) Patent No.: US 12,531,601 B2
(45) Date of Patent: Jan. 20, 2026

(54) AUTONOMOUS RECONFIGURABLE INTELLIGENT SURFACE USING ANTENNAS AND POWER-DEPENDENT SWITCHABLE RECTIFICATION MECHANISM

(71) Applicant: Dell Products L.P., Round Rock, TX (US)

(72) Inventors: Navjot Kaur Khaira, Manotick (CA); Tejinder Singh, Manotick (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/734,579

(22) Filed: Jun. 5, 2024

(65) Prior Publication Data

US 2025/0379615 A1   Dec. 11, 2025

(51) Int. Cl.
*H04B 7/04* (2017.01)
*H04B 7/01* (2006.01)

(52) U.S. Cl.
CPC .......... *H04B 7/04013* (2023.05); *H04B 7/01* (2013.01)

(58) Field of Classification Search
CPC .............................. H04B 7/04013; H04B 7/01
(Continued)

(56) References Cited

U.S. PATENT DOCUMENTS

| | | | |
|---|---|---|---|
| 11,942,795 B1 * | 3/2024 | Tsai | ........................ H01Q 1/248 |
| 2007/0046547 A1 | 3/2007 | Crouch | |

(Continued)

FOREIGN PATENT DOCUMENTS

| | | |
|---|---|---|
| CN | 110635697 A | 12/2019 |
| CN | 111262045 A | 6/2020 |
| WO | 2024/047370 A1 | 3/2024 |

OTHER PUBLICATIONS

Zhuang et al., "Future Internet Bandwidth Trends: An investigation on Current and Future Disruptive Technologies", Department of Computer Science and Engineering, Polytechnic Institute, Technical Report TR-CSE-2013-04, Nov. 1, 2013, 27 pages.

(Continued)

*Primary Examiner* — Emmanuel Bayard
(74) *Attorney, Agent, or Firm* — Amin, Turocy & Watson, LLP

(57) ABSTRACT

The technology described herein is directed towards a reconfigurable intelligent surface (RIS) that harvests RF energy from incoming signals based on energy harvesting antennas and associated energy harvesting circuitry. At the same time RIS elements (unit cells) redirect the incoming signals towards a predetermined direction. The harvested energy is combined and converted to DC power using a harvesting circuit. In one implementation, a dual-mode energy harvesting circuit employs a higher power rectifier subcircuit and a lower power rectifier subcircuit, with a multiport circulator and switch that self-actuates to use one or the other rectifier subcircuit based on the combined RF input power captured by the energy harvesting antennas. A multiple battery approach is described, in which one battery is charging based on the converted DC power, another, previously-charged battery is powering the reconfigurable intelligent surface components.

20 Claims, 11 Drawing Sheets

(58) Field of Classification Search
USPC .................................. 375/262, 267, 299, 349
See application file for complete search history.

(56) References Cited

U.S. PATENT DOCUMENTS

| | | |
|---|---|---|
| 2012/0146425 A1 | 6/2012 | Lee et al. |
| 2012/0153888 A1 | 6/2012 | Jung |
| 2012/0235860 A1 | 9/2012 | Ghazarian |
| 2020/0227818 A1 | 7/2020 | Huang et al. |
| 2020/0336023 A1 | 10/2020 | Zeine et al. |
| 2021/0203830 A1* | 7/2021 | Liu ................... H04N 23/73 |
| 2022/0037123 A1 | 2/2022 | Zhang et al. |
| 2022/0314833 A1 | 10/2022 | Jiang et al. |
| 2023/0097967 A1 | 3/2023 | Saboury et al. |
| 2023/0318316 A1 | 10/2023 | Brochtrup et al. |
| 2024/0235271 A1* | 7/2024 | Tayyab ............... H02J 50/001 |
| 2024/0339754 A1 | 10/2024 | Tam et al. |
| 2025/0007567 A1* | 1/2025 | Haustein ............ H04B 7/04013 |
| 2025/0187478 A1* | 6/2025 | Ferone ................. B60L 53/65 |
| 2025/0244159 A1* | 7/2025 | Anderson ............. G01F 23/802 |

OTHER PUBLICATIONS

Poulakis, Marios, "Metamaterials Could Solve One of 6G's Big Problems [Industry View]", in Proceedings of the IEEE, vol. 110, No. 9, Sep. 2022, pp. 1151-1158.

Taha et al., "Enabling Large Intelligent Surfaces with Compressive Sensing and Deep Learning", in IEEE Access, vol. 9, Mar. 4, 2021, pp. 44304-44321.

Liaskos et al., "ABSense: Sensing Electromagnetic Waves on Metasurfaces via Ambient Compilation of Full Absorption", In Proceedings of the Sixth Annual ACM International Conference on Nanoscale Computing and Communication, 2019, 7 pages.

Tesla, Nikola "The Transmission of Electric Energy Without Wires", In Electrical World and Engineer, Jun. 4, 1904, 2 pages.

Curty et al., "Design and Optimization of Passive UHF RFID Systems", vol. 323, Springer, 2007, 150 pages.

Awad et al., "Design of Dickson Rectifier for RF Energy Harvesting in 28-nm FD-SOI Technology", in 2018 Joint International EUROSOI Workshop and International Conference on Ultimate Integration on Silicon (EUROSOI-ULIS), IEEE, 2018, 4 pages.

Hillman et al., "Scaleable Vanadium Dioxide Switches with Submillimeterwave Bandwidth: VO2 Switches with Improved Bandwidth and Power Handling", in 2017 IEEE Compound Semiconductor Integrated Circuit Symposium (CSICS), 2017, pp. 1-4.

Khaira et al., "Self-Powered Autonomous Reconfigurable Intelligent Surfaces Using Wide Radio Frequency Power Range Harvesting Circuit", U.S. Appl. No. 18/669,852, filed May 21, 2024, 52 pages.

Khaira et al., "Self-Powered Reconfigurable Intelligent Surfaces Utilizing Radio Frequency Energy Harvesting", U.S. Appl. No. 18/614,932, filed Mar. 25, 2024, 45 pages.

Khaira et al., "Channel Estimation in a Reconfigurable Intelligent Surface Using Substrate Integrated Waveguides", U.S. Appl. No. 18/613,388, filed Mar. 22, 2024, 38 pages.

Non-Final Office Action received for U.S. Appl. No. 18/669,852 dated May 29, 2025, 25 pages.

Liu et al., "Reconfigurable Intelligent Surfaces: Principles and Opportunities", IEEE Communications Surveys & Tutorials, vol. 23, No. 3, Third Quarter 2021, pp. 1546-1577.

Marian, "Potentials of an Adaptive Rectenna Circuit", IEEE Antennas and Wireless Propagation Letters, vol. 10, 2011, pp. 1393-1396.

Control Network Newsletter, "Why You Should Not Mix Full-Wave and Half-Wave Powered Devices", 2020, pp. 1-2.

Final Office Action received for U.S. Appl. No. 18/669,852, dated Aug. 20, 2025, 22 pages.

Notice of Allowance received for U.S. Appl. No. 18/669,852 dated Oct. 29, 2025, 15 pages.

\* cited by examiner

AUTONOMOUS RECONFIGURABLE INTELLIGENT SURFACE USING ANTENNAS AND POWER-DEPENDENT SWITCHABLE RECTIFICATION MECHANISM

BACKGROUND

Reconfigurable intelligent surfaces (alternatively referred to as intelligent reflective surfaces, or metasurfaces) are manmade thin reflective or refractive surfaces whose electromagnetic response can be electronically controlled. A reconfigurable intelligent surface is generally characterized by having a two-dimensional planar array of electronically controllable reflecting elements that can dynamically manipulate electromagnetic waves. These elements are capable of altering the phase shift of the reflected signals, whereby through precise adjustment of these phase shifts, sophisticated reflect beamforming can be executed.

Many reconfigurable intelligent surface designs are passive, in that they reflect the signals without needing additional amplification. However, there is still non-negligible power consumed for manipulating the phase shifts.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
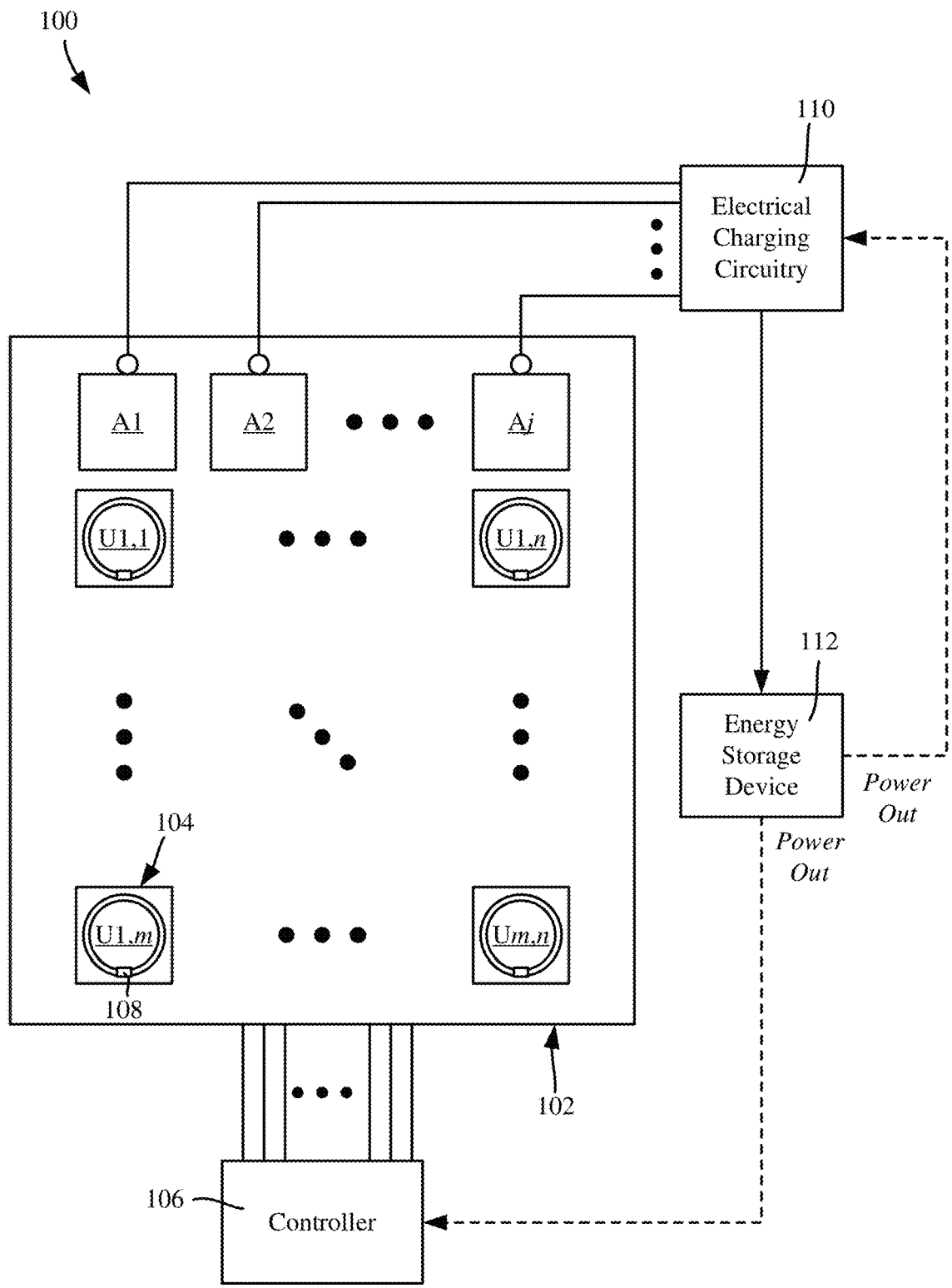
FIG. 1 is an example conceptual block diagram showing a reconfigurable intelligent surface that includes unit cells for redirecting incoming electromagnetic signals, and antennas for harvesting energy from the incoming electromagnetic signals, in accordance with various example embodiments and implementations of the subject disclosure.

The technology described herein is generally directed towards a reconfigurable intelligent surface that includes unit cells, along with integrated energy harvesting antennas and energy harvesting circuitry, where in general, energy harvesting refers to extracting energy from the surrounding environment. As described herein, the harvested energy is used to power the components of the reconfigurable intelligent surface, including for tuning the phases of the unit cells, in order to controllably redirect (e.g., reflect or refract) an incoming electromagnetic wave. In this way, the harvested electromagnetic energy can partially or fully self-power the reconfigurable intelligent surface module to enhance network energy efficiency. At the same time, energy harvesting is accomplished in conjunction with the incoming signal energy being reflected in a controlled shape and/or direction.

In one implementation, there is an antenna array (or at least one antenna) deployed with a reconfigurable intelligent surface of unit cells that are configured for redirecting an incoming electromagnetic wave. For signal redirection, the unit cells include a variable tuning element, such as a varactor that changes capacitance according to applied bias voltage values. A controller (e.g., control unit) manages the bias for the reconfigurable intelligent surface's unit cells that are used for signal redirection, such as to separately adjust their phase shifts to produce constructive interference in a desired beamforming direction and/or beam strength.

For energy harvesting, energy from the incident wave is captured by an energy harvesting antenna (e.g., an antenna array), and made accessible via energy harvesting contacts. The energy harvesting contacts coupled to the antennas are coupled to charging circuitry; more particularly, the separately harvested energy portions are coupled via the contacts to a radio frequency (RF) power combiner, which outputs the combined energy to an impedance matching circuitry, and then to a wide range power rectifier to obtain DC (direct current) power. The use of RF power combiners eliminates or helps reduce the need for various groups of multiple rectifiers and impedance matching networks, effectively minimizing energy loss attributed to RF impedance mismatches. In this way, energy from an incoming signal is coupled to the charging circuitry via the antennas, which can be output as harvested DC energy from the charging circuitry.

In one implementation, the wide range power rectifier includes two rectifier subcircuits, one designed for lower RF power, and another designed for higher RF power; the RF power can range from −20 dBm to +30 dBm, for example. A power dependent self-actuating RF switch, in conjunction with a circulator to which the RF input energy is input, automatically self-actuates to switch the RF input energy to the higher power rectifier at a crossover point of, for example, +19 dBm, such that high energy conversion efficiency results as described herein, and de-self actuates below the crossover point resulting in the RF input energy being coupled to the lower power rectifier to maintain high efficiency. In one particular example, a seven-stage rectifier designed with low power diodes having lower threshold voltages is used for low power conditions, while a ten-stage rectifier designed with diodes having higher threshold voltages is used for higher power conditions.

In one implementation, two distinct energy storage devices (e.g., batteries or capacitors) are available, one for charging via the harvested energy as rectified into DC output, and one for providing power for the reconfigurable surface tunable components, including the controller. In the example of batteries, one battery is charged with the RF coupled harvested energy, while the other, previously charged battery, supplies power to the electronic components. A power management module (e.g., an intelligent device) monitors the battery power levels, and based on at least one of the levels satisfying a threshold level, simultaneously switches the roles of the batteries from discharging power to charging, and vice-versa, adopting a "harvest-store-use" model as opposed to a more traditional "harvest-use" model.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a reconfigurable intelligent surface 102 composed of an array of m×n unit cells U1,1-Um,n (one of which is also labeled 104) of a type that reflects incoming electromagnetic signals. The example unit cells U1,1-Um,n are coupled to a controller 106 for DC bias voltage application from the controller 106. More particularly, for redirecting impinging signals, the reconfigurable intelligent surface 102 is coupled to or otherwise incorporates the controller 106 that controls the individual phase shifts of the unit cells U1,1-Um,n, which are designed for signal redirection at a desired input frequency. This allows the incoming electromagnetic wave/signal to be redirected (reflected or refracted) as a beam that can be shaped and steered in a desired direction.

In one implementation, each unit cell (e.g., the unit cell 104) includes a resonating pattern of metallic elements, such as including a generally ring-shaped resonator configured to resonate when the incoming electromagnetic (EM)/radio frequency (RF) wave is impinging on the unit cell 104, such as an RF signal near or within the millimeter wavelength, e.g., (above 25 gigahertz). In general, the metallic resonating pattern is designed to resonate at a frequency that corresponds to the frequency of the incoming signal. As set forth herein, a unit cell 104 can have a resonating pattern of any suitable shape (e.g., square, rectangular, concentric ring-shape, coupled circles and so on) that resonates at a corresponding frequency of the incoming signal, and is thus not limited to any particular pattern. Note that in the examples herein, a unit cell 104 is designed for operation at millimeter wave frequencies; notwithstanding, the technology described herein can be easily extended to other frequency ranges.

Thus, in general, the metallic resonating pattern is designed for operation at a desired resonance frequency that corresponds to the frequency of the incoming signal. A variable tuning device 108 (e.g., surface mounted inside or proximate to the resonating pattern's ring), which can be a varactor, a PIN diode, an array of fixed capacitors, an array of fixed inductors, or a capacitance tuning device with the capability of changing the capacitance of the unit cell 104, changes the phases of the unit cell based on the amount of applied bias voltage. That is, the variable tuning device 108 is also designed for operation at the desired resonance frequency, with a change in capacitance of the variable tuning device 108 determined by bias voltage as applied by the controller 106. The change in capacitance makes the phase of the unit cell 104 reconfigurable. In this way, each unit cell such as the unit cell 104 is capable of offering a reconfigurable phase to the incoming EM signal when provided with different voltage levels to the variable tuning device 108. When the phases of the individual unit cells are appropriately chosen and voltage-controlled by the controller 106 via the variable tuning device (e.g., 108), the various phases modify the reflected electromagnetic wave, such as to result in constructive interference in a desired reflection direction. Note that such a variable tuning device (e.g., varactor) can be integrated into the unit cell, or can be a commercial product coupled (e.g., surface mounted) to the unit cell. Further, instead of or in addition to varactors, integrated tuning can be accomplished with PIN diodes, as well as any mechanism that can tune a unit cell's phase.

With respect to energy harvesting, in one example implementation, the reconfigurable intelligent surface 102 includes an array of antennas A1-Aj. The antennas A1-Aj receive the electromatic signals and output the energy to electrical contacts (e.g., the small circles atop the antennas A1-Aj) for coupling to electrical charging circuitry 110. As described herein, the electrical charging circuitry 110 charges an energy storage device 112, e.g., at least one battery and/or capacitor, which is used to power the controller 106, as well as any active components of the electrical charging circuitry 110.

It should be noted that the energy harvesting antenna or antennas need not be directly implemented on the reconfigurable intelligent surface panel, but instead can be deployed along with a reconfigurable intelligent surface and coupled thereto. However, implementing the reconfigurable intelligent surface with the antenna array directly on the surface facilitates efficient fabrication, as, for example, patch antennas can be fabricated along with the unit cells on a substrate of the reconfigurable intelligent surface. Further, because the reconfigurable intelligent surface is generally deployed so as to receive signals from a specific transmitter location, the antenna(s) need do so as well, which is inherent when they are implemented directly on the same substrate as the unit cells and thus similarly aligned.

It also should be noted that a single antenna does not provide a sharp beam, whereas an antenna array does, that is, the radiation pattern will be different. Indeed, in practice performance improvement results from having more than one energy harvesting antenna. Thus, in further examples herein, an antenna array having more than one antenna is described. Notwithstanding, the technology described herein is not limited to a multiple antenna array, but also works with a single antenna "array" element, such as one larger antenna element that covers approximately the same area as a multiple antenna array, or for a patch antenna, approximately the same combined patch area of a multiple antenna array.

Figure 2:
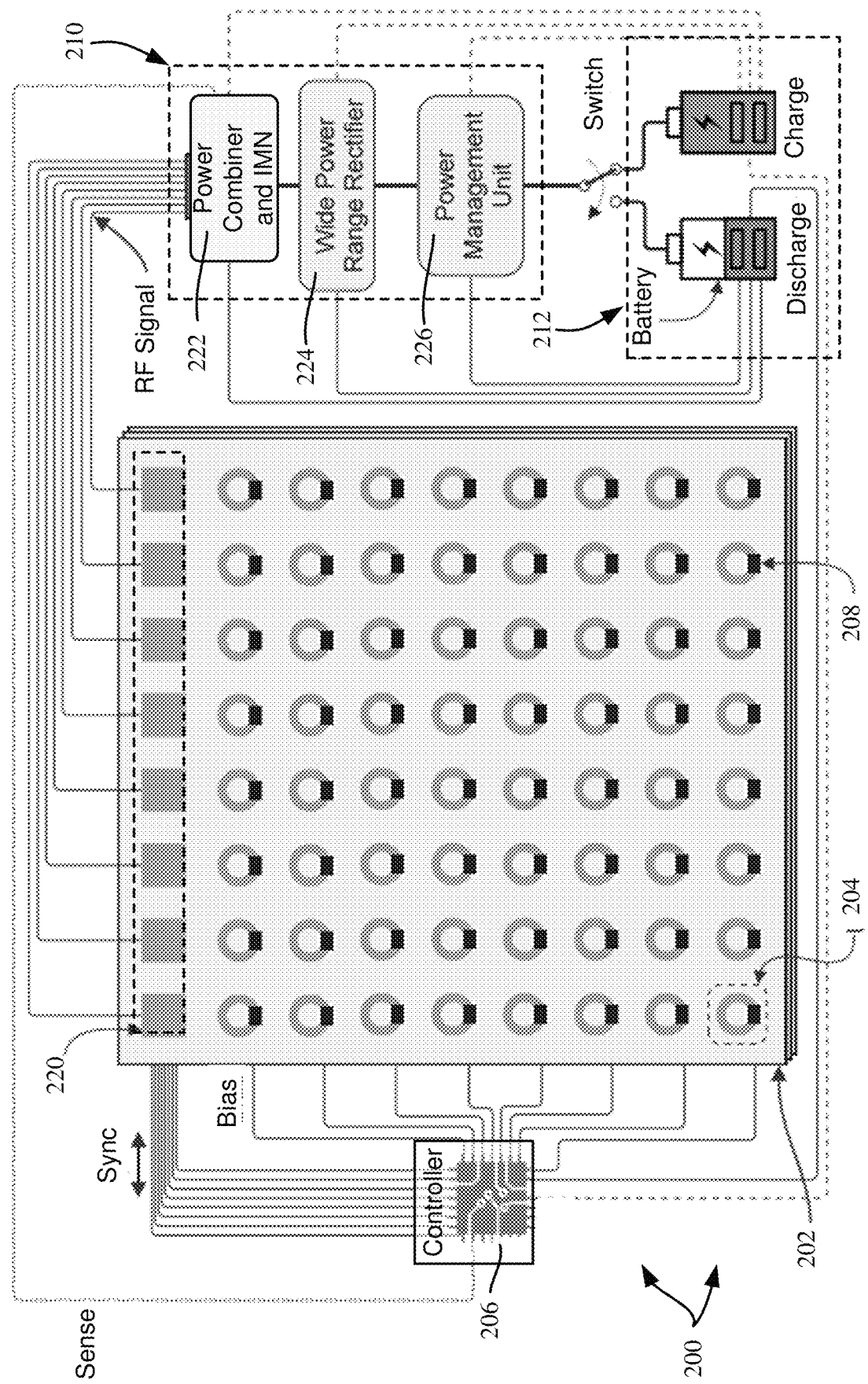
FIG. 2 is a representation of a reconfigurable intelligent surface with an 8×8 array of unit cells and an energy harvesting antenna array, along with circuitry for charging an energy storage device, and a controller for using power from the energy storage device, in accordance with various example embodiments and implementations of the subject disclosure.

FIG. 2 presents further details of an RF energy harvesting design/system 200 on a reconfigurable intelligent surface panel 202, including an antenna array 220, a power combining circuit (along with an impedance matching network, or IMN) 222, and an advanced multistage, wide power range voltage rectifier circuit 224 as described herein. A power management unit/module 226 can be considered part of the RF energy harvesting charging circuitry (block 210) as described herein. This system 200 captures RF signals across the reconfigurable intelligent surface's operational frequency band using patch microstrip antennas; eight such patch microstrip antennas are shown in the example antenna array 220. By employing a power combining and matching strategy, the system maximizes the amount of RF energy funneled to the rectifier 224. In turn, the rectifier 224 output, via a power management unit/module 226, charges the energy storage device 212, which in this example is one battery selected for charging while the other battery discharges to power the active components including the controller 206.

Optimizing the efficiency of ambient RF energy capture is significant and relies heavily on the design of the receiver antenna(s) and the RF matching network(s). To ensure maximum energy collection, each antenna's gain should be maximized, and the conversion of RF energy to DC power should occur with minimal thermal and electrical losses. For this circuit, the RF combiner and matching network(s) 222 can be constructed using microstrip technology to align with the antenna and feed's design specifications and to facilitate the seamless integration of the circuit elements.

The reconfigurable intelligent surface unit cells (e.g., 202) contain one tuning element (e.g., 208) each, to achieve the reconfigurable operation. The reconfigurable intelligent surface controller 206 is used to provide appropriate bias to these tuning elements based on the desired beam direction/phase configuration. The controller 206 also provides a synchronization (sync) signal to the antennas in the array 220 and also senses the total input power collected by the antennas at the power combiner 222. In this way, any active adjustments can be made.

Figure 3:
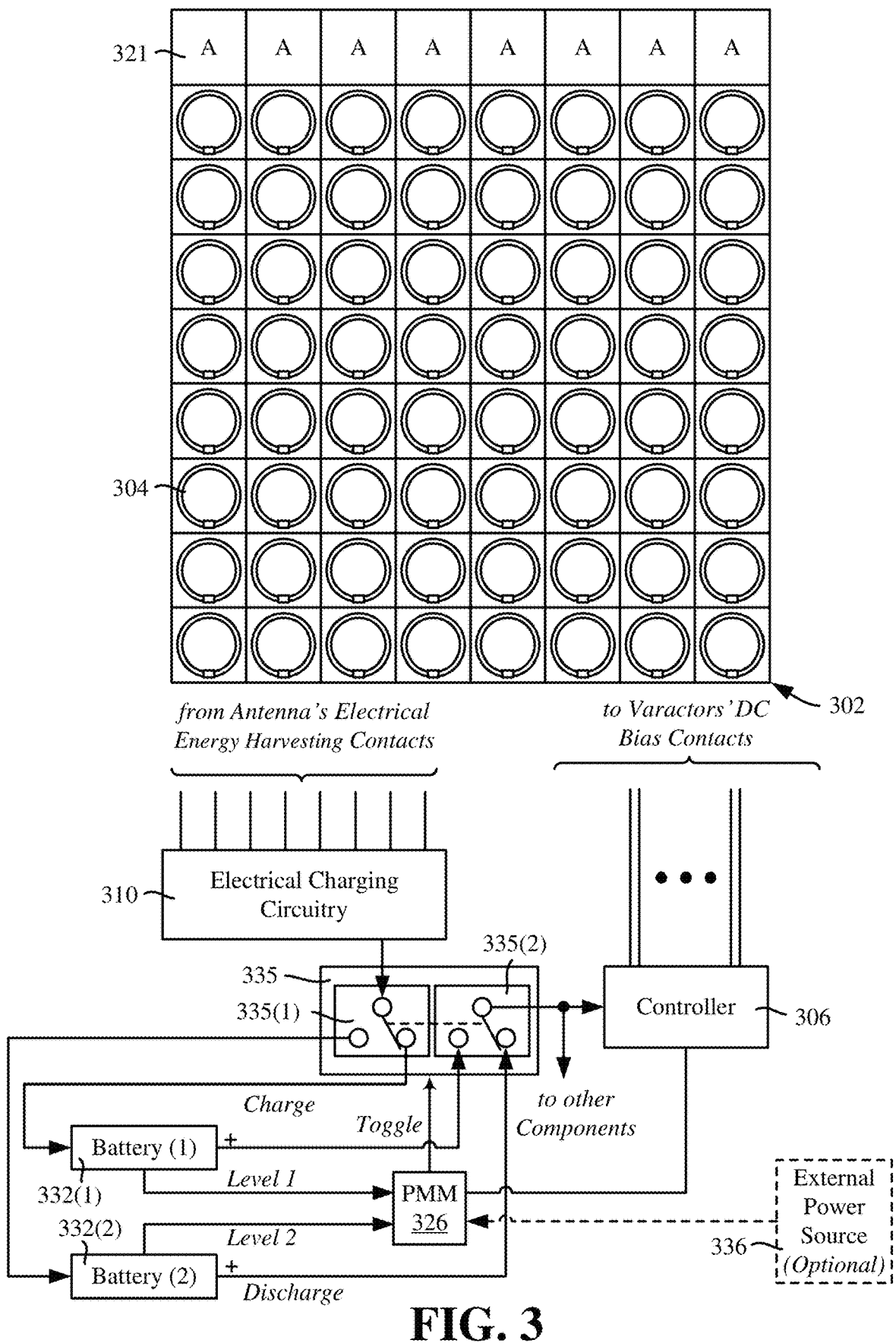
FIG. 3 is a top view representation of an example reconfigurable intelligent surface showing how energy collected from electrical energy harvesting antennas can be used to selectively charge batteries, in accordance with various example embodiments and implementations of the subject disclosure.

FIG. 3 is a top view representation of an example 8×8 array of sixty-four unit cells of a reconfigurable intelligent surface 302, with each unit cell generally corresponding to one of the example unit cells 104 or 204 of FIG. 1 or 2, respectively. One of the unit cells for redirecting the incoming wave is labeled 304 in FIG. 3. One of the antenna elements (e.g., patch antennas "A") that is designed for energy harvesting is labeled 321 in FIG. 3. As can be readily appreciated, the distribution pattern need not be such that the unit cells or antenna elements are grouped together, and, for example, the antenna elements can be distributed or interleaved among the unit cells. The number of unit cells and antennas, as well as the total number in the m×n array of unit cells and number of antennas j, can be determined during design, e.g., for a particular reconfigurable intelligent surface deployment.

As represented in FIG. 3, a controller 310 is coupled to provide respective biasing voltages to the respective unit cells' bias contacts coupled to the respective varactors (and/or other variable tuning devices, although varactors are described in this example). Further, the controller 310 is coupled to a battery (currently the battery (2) 332(2) in the example of FIG. 3) to obtain the power needed to adjust the varactors.

As described herein, electrical charging circuitry 310 charges a selected one of the batteries (currently the battery (1) 332(1) in the example of FIG. 3) while the other battery 332(2) powers the controller 306 and any other power-consuming components of the reconfigurable intelligent surface, such as memory (if not internal to the controller) for storing different sets of the unit cell's phases, communication circuitry for obtaining the different sets of the unit cell's phases, power consuming devices of the charging circuitry 310, and so on. The reconfiguration instructions can be received wirelessly at the controller 306, which then provides the corresponding voltage biases to the individual varactors/PIN diodes/other variable tuning devices of the reconfigurable intelligent surface elements.

A power management module (PMM,/a power management unit (PMU)) 326 monitors the charge levels of the batteries 332(1) and 332(2), and, for example, if the battery currently being discharged to provide power satisfies a discharge threshold level, actuates a double-pole, double-throw (DPDT) switch 335 (represented by jointly-actuated internal switch parts 335(1) and 335(2)), such that the batteries 332(1) and 332(2) swap roles, that is, the battery 332(1) starts powering the components while the battery 332(2) begins recharging; (instead of a double-pole, double-throw switch, separate switches can be used and jointly toggled by the power management module 326). Note that if the battery 332(1) is fully charged (or deemed sufficiently charged to a threshold charge level), this can also cause the power management module 326 to toggle the DPDT switch 335. It is also possible to have more than two batteries and/or other power storage devices (e.g., capacitors).

An optional external power source 336 may be used, if available, in the event that the battery being charged is still too low to take over for a fully or mostly discharged battery. The optional external power source 336, if present, can also be used to assist in charging the batteries in such a condition. Note however that one of the design considerations for some reconfigurable intelligent surface deployments is to provide a fully autonomous, self-powered reconfigurable intelligent surface that (e.g., during its normal lifetime) never needs such an external power source.

To summarize, the generated DC power is used to charge batteries (or alternatively capacitors) serving as energy storage devices. These devices operate in a cyclical manner; one charges while the other discharges to power the control chips and rectifying circuits. Upon one device being (e.g., fully) charged and/or the other sufficiently depleted, they switch roles. A power management module/device (or unit, PMU) oversees the decision to either store the harvested electricity or use the stored energy. One implementation of the system thus utilizes a dual-battery configuration with this power management system, employing a harvest-store-use model over a direct harvest-use approach. With the harvest-store-use strategy, the system is outfitted with an energy storage solution or rechargeable battery that holds the harvested electricity. This arrangement allows for the storage of surplus energy when the amount harvested exceeds the system's energy use for subsequent utilization. Note that with a direct harvest-use strategy, the energy collected is used instantly to operate the network node, necessitating that the produced electricity perpetually surpasses the node's minimal energy requirement to maintain normal function; failing this, the node becomes inoperative, which means that the direct harvest-use strategy is more likely to become inoperative unless a large, oversubscribed number of antennas are dedicated to harvesting, (likely meaning a larger, more expensive reconfigurable intelligent surface).

Regular energy harvesting circuits are effective only over narrow frequency ranges, are limited in efficiency response, and require higher levels of input power. Described herein is an energy harvesting circuit including a wide range power rectifier 424 (FIG. 4) that switches between two subcircuits 442 and 444, e.g., one composed of a seven-stage design and another composed of a ten-stage design, respectively, the former being more receptive in the lower input power regions, while the latter is more suitable for higher power ranges. In one implementation, the rectifier operates between the low-power (−20 dBm) and high power (+30 dBm) extremities and the crossover operational point between the two subcircuits is decided by the use of a circulator 446 along with a power-dependent switch. The AC-to-DC conversion efficiency achieved for different levels of input RF power can be seen from the simulation results depicted graphically in FIGS. 5-9.

Figure 4:
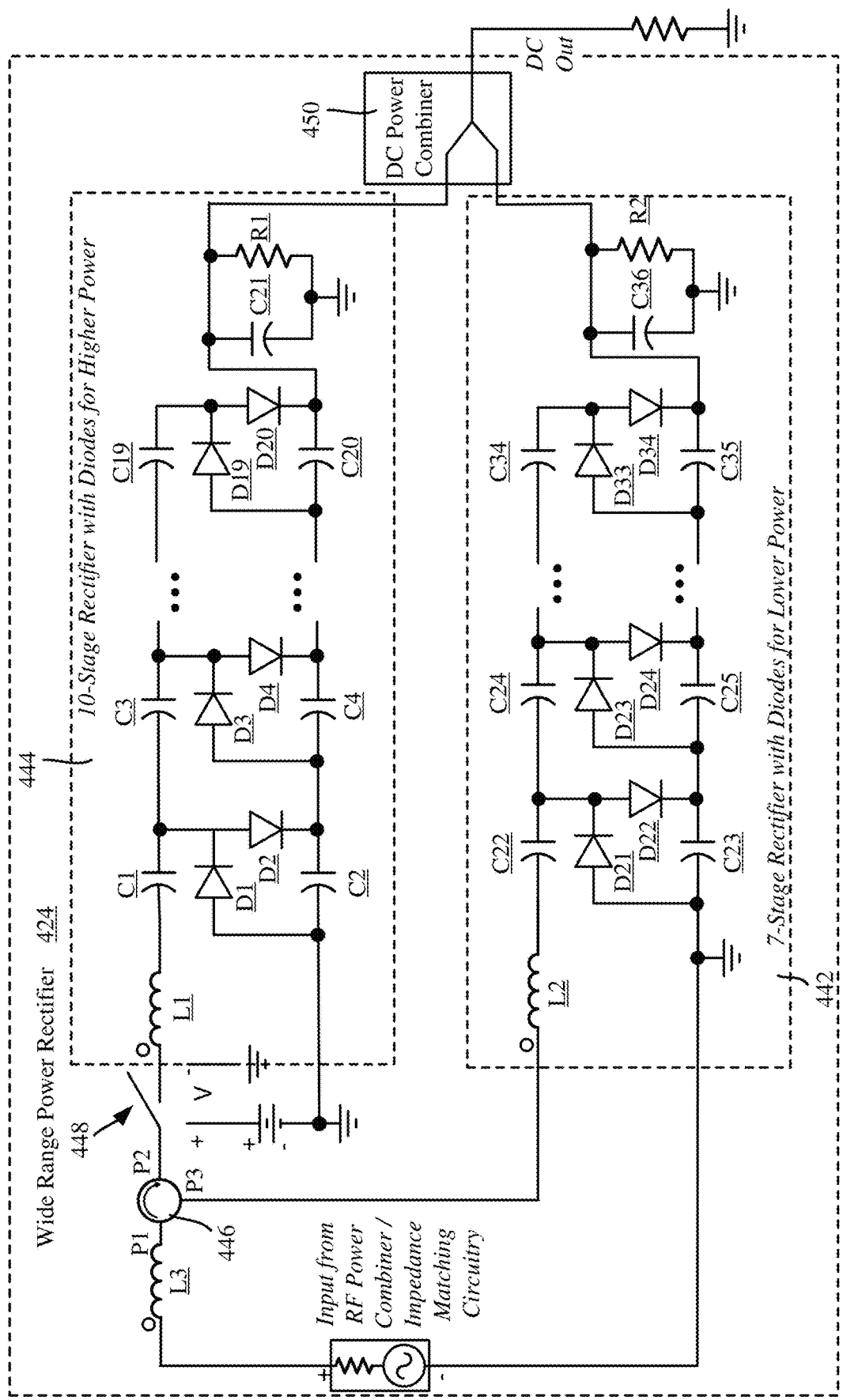
FIG. 4 is a representation of an example wide range power rectifier with different multistage rectifier subcircuits that can be used in the charging circuitry of FIGS. 2 and 3, in accordance with various example embodiments and implementations of the subject disclosure.

Thus, one example implementation of the wide range power rectifier 424 is capable of accommodating a broad spectrum of power levels, ranging from as low as −20 dBm up to +30 dBm. The architecture of one such wide range rectifier, shown in FIG. 4, is engineered with two distinct subcircuits 442 and 444; the subcircuit 442 is optimized for high efficiency at lower power levels, and the other subcircuit 444 for optimized for higher power scenarios. This dual-circuit approach leverages different types of diodes to achieve efficiency across the power spectrum; diodes with lower threshold voltages excel in low power conditions, while those with higher thresholds are better suited for elevated power levels.

To harness the advantages of both subcircuits effectively, a device for toggling between the two subcircuits 442 and 444 based on the incoming power level is employed. This switching device includes a three-port device circulator 446 and a self-actuating RF switch 448, e.g., a vanadium dioxide (VO2)-based power-sensitive RF switch. The first port (P1) of the three-port device circulator 446 receives the combined RF input, the second port (P2) connects to the higher power (e.g., ten-stage) rectifier subcircuit 444 via the power sensitive RF switch 448, and the third port (P3) connects to the lower power a (e.g., seven-stage) rectifier subcircuit 442. At lower input power levels, the switch 448 is open, whereby the signal flows from the input port P1 to output port P3 (reflected back from the open switch), directing the combined RF signal to the lower power rectifier subcircuit 442, as port P2 remains in an open circuit state (with the switch deactivated/self-de-actuated). Conversely, with higher input power level at port P1, the VO2 switch 448 self-actuates and the input signal is routed to the higher power (e.g., ten-stage) rectifier subcircuit 444; no signal goes to the port P3 of the circulator 446.

Thus, for this rectifier subcircuit switching, a combination of a circulator 446 and a power-dependent VO2 switch 448 can be used. Note that such a VO2 switch self-actuates at different input RF power levels based on different design dimensions and specifications, which have been previously measured. In general, the switch design utilizes a series shunt architecture, and has known self-switching and recovery data for different channel lengths, and power transmission characteristics of VO2 switches. Significant hysteresis can be observed in the self-switching and recovery.

At any given time, the output from either of the rectifier subcircuits is combined using a DC power combiner 450. This generated DC power is used to charge batteries and/or capacitors, serving as energy storage devices.

Note that the matching network (IMN 222, FIG. 2), which includes both inductive and capacitive components, plays a role in optimizing power transfer from the antenna to the voltage multiplier/rectifier. Minor adjustments to the parameters of the matching circuit can lead to substantial shifts in the frequency range where energy conversion efficiency peaks, sometimes by several megahertz. Therefore, the design of RF harvesting circuits involves multiple considerations that need to be addressed together.

In one implementation of the rectifier subcircuits' designs, a Dickson voltage rectifier type circuit can be used; a Dickson voltage rectifier (an active circuit) can provide high energy efficiency. Even higher energy efficiency can be achieved if the Dickson voltage rectifier is made using fully depleted silicon-on-insulator (FD-SOI) technology. There is a direct correlation between the output voltage and the number of stages, although practical limits cap the maximum stages and, consequently, the output voltage.

The rectifier's performance is significantly determined by the diode's characteristics, such as its saturation current, junction capacitance, and conduction resistance. The selection of an appropriate diode is thus part of the design of a rectifier to ensure maximum efficiency at a given power level; a commercially available Schottky diode (e.g., by Central Semiconductor CMSH1-20M) has been found suitable for the lower RF power range. Conversely, for the higher power circuit, a different commercially available diode can be used, (e.g., ST Microelectronics STPS20H100CT diode), which has been found suitable with respect to the energy conversion efficiency at higher input RF power.

The design for a rectifier circuit shown in FIG. 4 (and subcircuits with similar multiple stages) can be simulated using a circuit simulation tool (e.g., a commercially available Advanced Design System tool). The power typically received from unit cell element is replaced with a power source featuring a 50-Ohm internal impedance. The energy conversion efficiency in harvesting circuits is significantly affected by the number of rectifier stages. Each stage is a modified voltage multiplier, arranged in series. For the lower power subcircuits (Ckt. A), simulations were run for configurations with five stages, seven stages, and nine stages, while for the higher power subcircuit (Ckt. B), the configurations of eight stages, ten stages, and twelve stages were evaluated.

Figure 5:
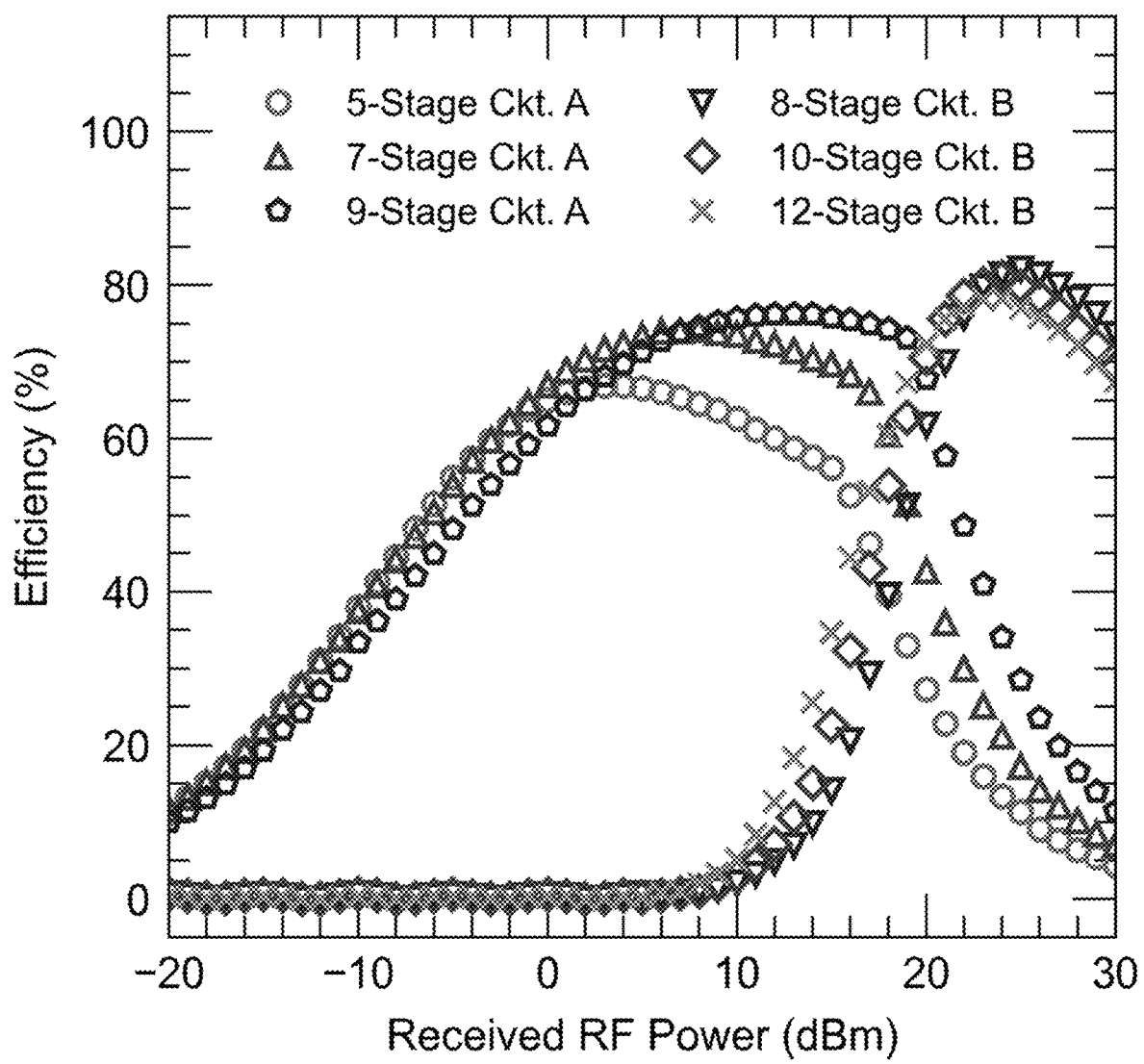
FIG. 5 is an example graphical representation of power conversion efficiency versus received radio frequency power for rectifiers with different stages, in accordance with various example embodiments and implementations of the subject disclosure.
Figure 6:
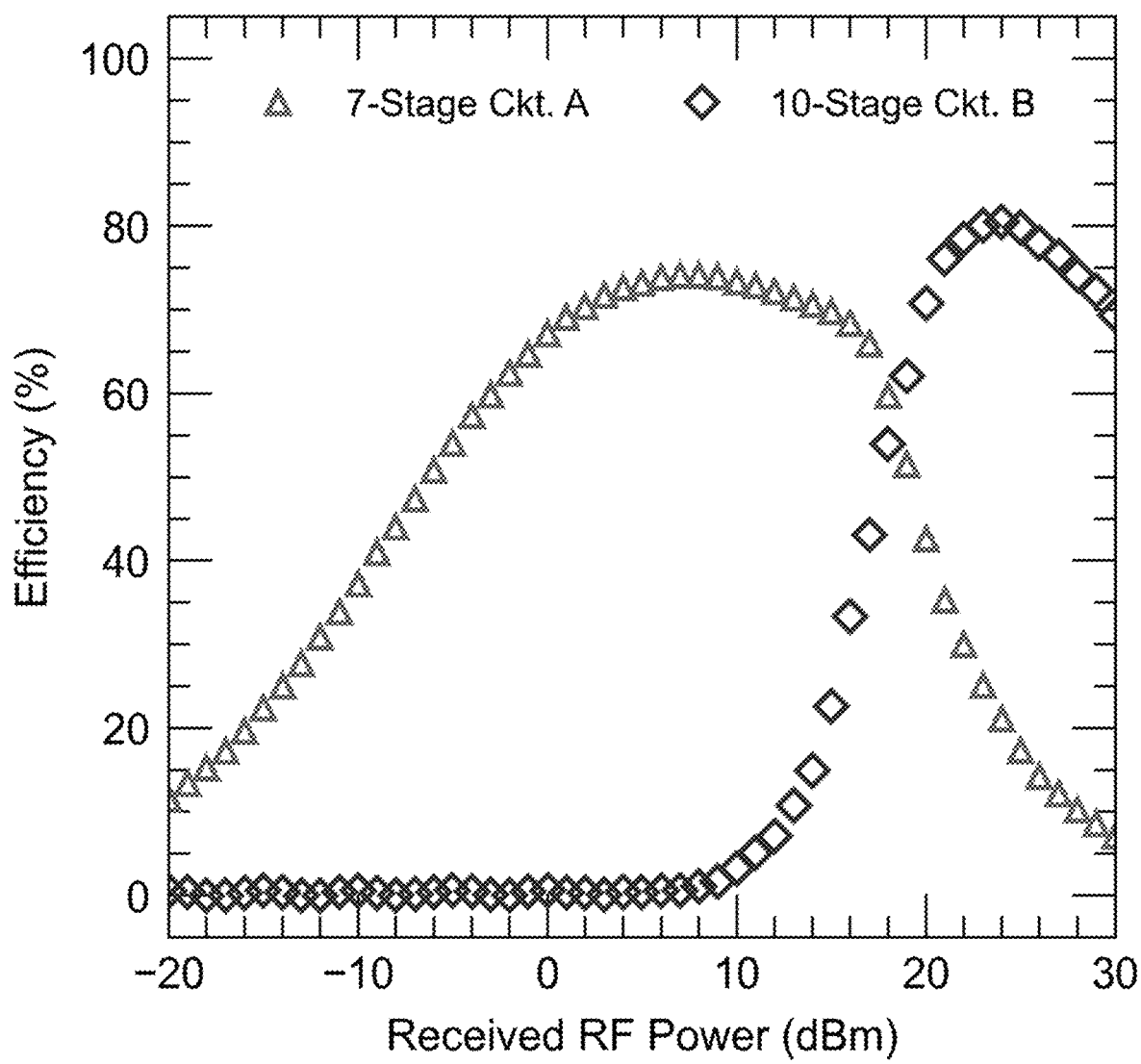
FIG. 6 is an example graphical representation of power conversion efficiency versus received radio frequency power for a seven stage rectifier and a ten-stage rectifier, in accordance with various example embodiments and implementations of the subject disclosure.

The simulation outcomes, which span input RF powers from −20 dBm to 30 dBm across various circuit stages, indicate that adding more stages enhances efficiency, as shown in the example graphical representation of power conversion efficiency versus input RF power for different stages of rectifiers for both subcircuits in FIG. 5, for different stage rectifiers. This addition not only improves efficiency but also shifts the peak efficiency to higher power levels. To achieve optimal efficiency across the entire power spectrum, as shown in FIG. 6, a seven-stage rectifier configuration was chosen for the lower power subcircuit 442, and a ten-stage rectifier configuration was chosen for the higher power subcircuit 444. As shown in FIG. 6, by toggling between these two configurations at the crossover point of approximately 19 dBm, the most efficient scenario is achieved.

For example, because higher RF signal energy is available for a reconfigurable intelligent surface located closer to the transmitter, at that time the ten-stage rectifier subcircuit 444 (FIG. 4) is activated. When the reconfigurable intelligent surface is placed further away from the transmitter, the input RF signal energy is lower, whereby the seven-stage rectifier subcircuit 442 is activated. As a result, the best efficiency is achieved from either of the rectifier subcircuits depending on the input RF power level.

Thus, each reconfigurable intelligent surface component is selected for a specific frequency, with impedance matching achieved through a resonator circuit tuned to this frequency, enhancing the power transfer efficiency between the reconfigurable intelligent surface components and the multiplier. The efficiency of RF energy harvesting depends on the power of the transmitted signal, its wavelength, and distance between the RF source and the reconfigurable intelligent surface panel. The circuits employed for impedance matching networks in energy harvesting circuits include LC (inductor/capacitor) networks (which typically are passive but can be active devices). The function of the wide power range rectifier is to convert the input RF signals (AC type) captured by reconfigurable intelligent surface elements into DC voltage, which does so efficiently regardless of the input power.

To summarize, the integration of antennas on a reconfigurable intelligent surface for energy harvesting by harnessing ambient electromagnetic energy, converting it into electrical power through a sophisticated energy harvesting circuit. The reconfigurable intelligent surface unit cells (elements) perform the signal reflection, while the antennas are used for signal absorption for energy harvesting. This energy, collected from multiple antennas is combined using an RF combiner and then directed to an energy harvesting circuit which converts the collected AC energy into usable DC energy. Integrating an appropriate antenna, matching circuit, rectifying circuit, and energy storage unit enables the harnessing of ambient RF energy to power the RIS electronics fully or partially. This harvested energy is then stored in a battery or the like for meeting the energy needs of the reconfigurable intelligent surface panel; one implementation uses a double battery approach in which while one battery is charging, the other is powering the reconfigurable intelligent surface components.

The dual mode energy harvesting circuit that employs a rectifier of two subcircuits can leverage different types of diodes to achieve efficiency across the power spectrum. The rectifier automatically switches between the two rectifier subcircuits based on the incoming power level, using a circulator and a power-dependent switch to determine the crossover point. This topology facilitates high energy conversion efficiency for a wide spectrum of signal strengths, regardless of whether the reconfigurable intelligent surface is positioned very close to or at a greater distance from the signal transmitter, presenting a versatile solution for energy harvesting in various deployment scenarios.

Figure 7:
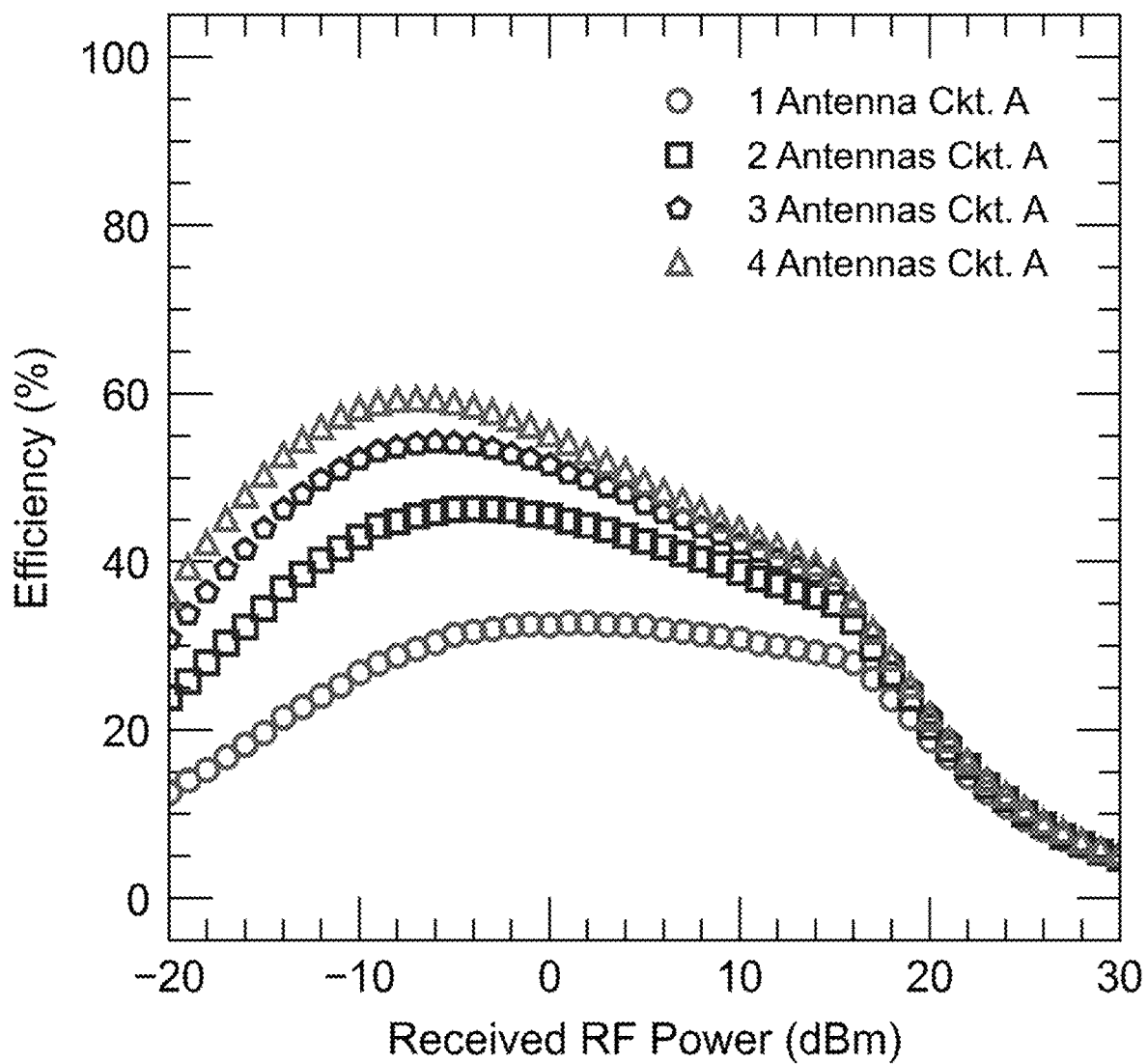
FIG. 7 is an example graphical representation illustrating the impact of incorporating multiple antennas with a rectifier circuit, with respect to improvement in efficiency for received power levels with a lower power rectifier subcircuit for different numbers of antennas, in accordance with various example embodiments and implementations of the subject disclosure.
Figure 8:
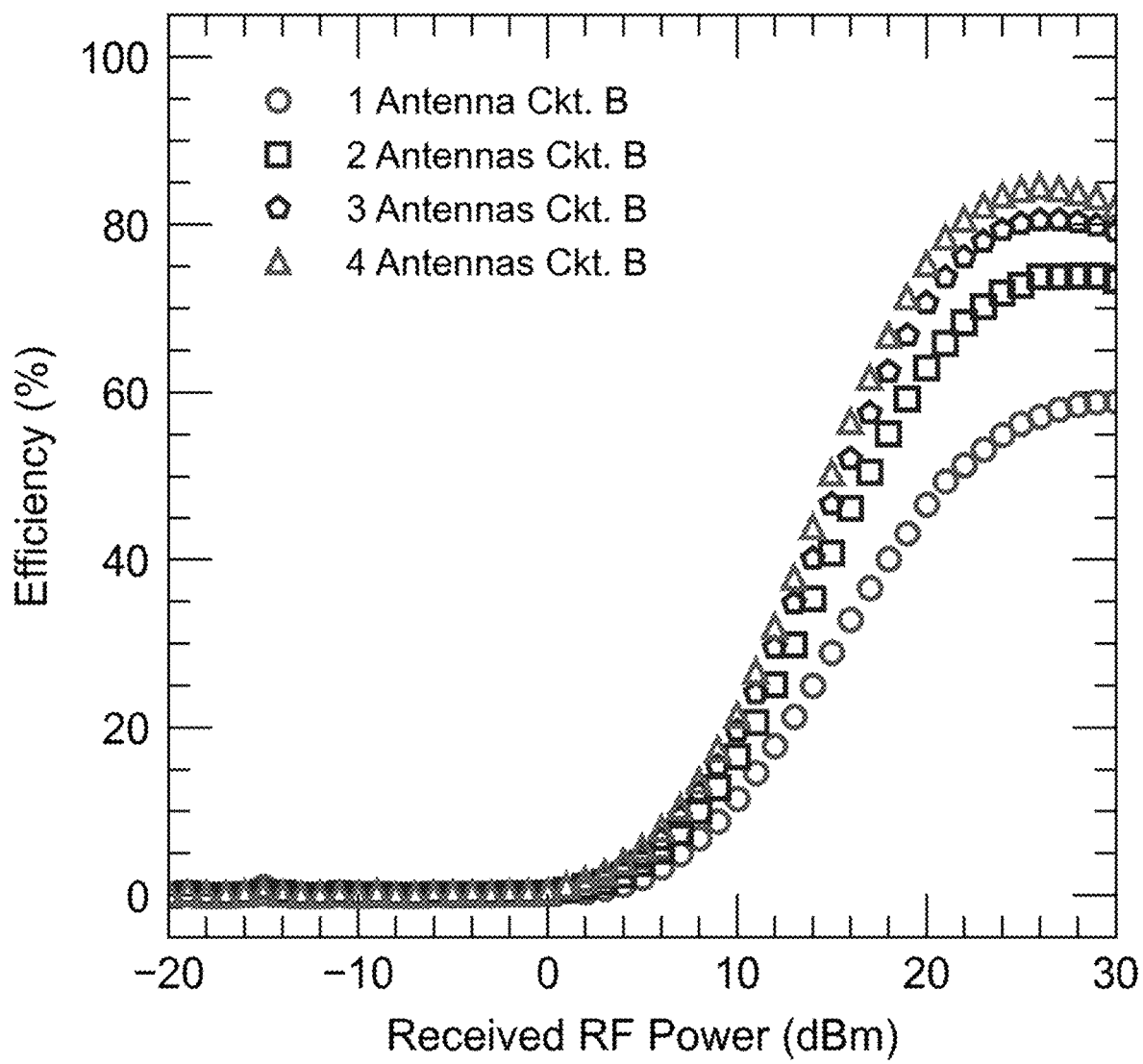
FIG. 8 is an example graphical representation illustrating the impact of incorporating multiple antennas with a rectifier circuit, with respect to improvement in efficiency for received power levels with a higher power rectifier subcircuit for different numbers of antennas, in accordance with various example embodiments and implementations of the subject disclosure.
Figure 9:
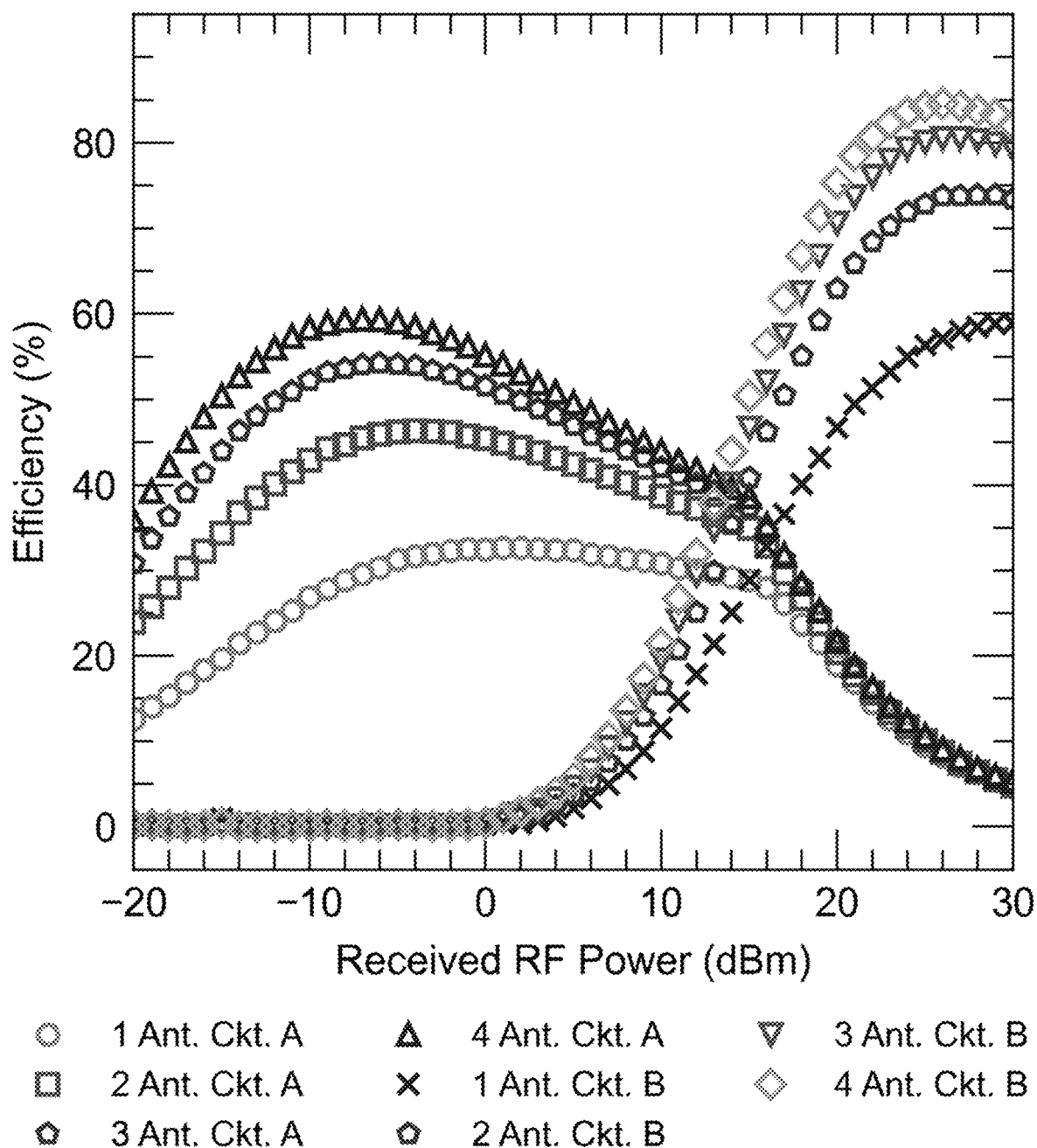
FIG. 9 is an example graphical representation illustrating the impact of incorporating multiple antennas with a rectifier circuit with respect to improvement in efficiency for received power levels with both lower power and higher power rectifier subcircuits for different numbers of antennas, in accordance with various example embodiments and implementations of the subject disclosure.

FIGS. 7 and 8 illustrate the impact of incorporating multiple antennas on single-stage rectifier circuit efficiency. The simulated results in FIGS. 7 and 8 of power conversion efficiency versus input RF power show the improvement in efficiency of lower-power circuit Ckt. A and higher-power circuit Ckt. B, respectively, when increasing the number of antennas from one to four. FIG. 9 shows power conversion efficiency versus input RF power for both subcircuits with different numbers of antennas. Increasing the number of antennas improves efficiency, primarily due to the increased capture of available ambient energy sources. Nonetheless, the relationship between the number of antennas and circuit efficiency is not linearly scalable indefinitely, because of several factors including diminishing returns, complexity and losses, and physical limitations.

One or more example embodiments can be embodied in a system, such as described and represented herein. The system can include a reconfigurable intelligent surface that redirects an incoming electromagnetic signal as a redirected electromagnetic signal, and respective unit cells of the reconfigurable intelligent surface. The respective unit cells can include respective variable tuning devices that are controllable to determine at least one of: a shape, a direction, or an amplitude of the redirected electromagnetic signal. The system further can include respective power harvesting antennas of the reconfigurable intelligent surface, the respective power harvesting antennas arranged to obtain harvested electrical energy from the incoming electromagnetic signal, and electrical charging circuitry coupled between the respective power harvesting antennas and an energy storage device, the electrical charging circuitry configured to convert the harvested electrical energy from the respective power harvesting antennas to direct current that charges the energy storage device.

The electrical charging circuitry can include a wide power range rectifier circuit, which can include a power-dependent radio frequency switch that self-actuates at a defined high radio frequency power level, resulting in coupling a first higher power rectifier subcircuit to the harvested electrical energy to output the direct current that charges the energy storage device, and self-de-actuates below the defined high radio frequency power level, resulting in coupling a second lower power rectifier subcircuit to the harvested electrical energy to output the direct current that charges the energy storage device.

The first higher power rectifier subcircuit can include a first multistage rectifier subcircuit having an even number of stages, and the second lower power rectifier subcircuit can include a second multistage rectifier subcircuit having an odd number of stages.

The harvested electrical energy can be combined and coupled to a first port of a multiport circulator device, and the multiport circulator device can have a second port coupled to the power-dependent radio frequency radio switch used to couple the first higher power rectifier subcircuit to the harvested electrical energy in response to the power-dependent radio frequency radio switch self-actuating, and a third port coupled to the second lower power rectifier subcircuit used to couple the second lower power rectifier subcircuit to the harvested electrical energy in response to the power-dependent radio frequency radio switch self-de-actuating.

The power-dependent radio frequency switch can include vanadium dioxide.

The energy storage device can include a first battery, and further can include a second battery, a controller, and a switch that is operational in a first state to couple the first battery to the electrical charging circuitry, in conjunction with the second battery providing power to the controller and to the respective variable tuning devices of the respective first unit cells, the respective variable tuning devices controllable by the controller to determine the at least one of: the shape, the direction, or the amplitude of the redirected electromagnetic signal. The switch can be operational in a second state to couple the second battery to the electrical charging circuitry, in conjunction with the first battery providing power to the controller and to the respective variable tuning devices of the respective first unit cells. The system further can include a power management unit that toggles the switch between the first state and the second state based on at least one of: a first level of charge of the first battery, or a second level of charge of the second battery.

The electrical charging circuitry can include a radio frequency power combiner can include inputs electrically coupled to respective electrical contacts of the respective energy harvesting antennas.

The respective energy harvesting antennas can include an antenna array of at least four antennas.

One or more example embodiments can be embodied in a system, such as described and represented herein. The system can include a reconfigurable intelligent surface of unit cells for redirection of incoming electromatic signals as redirected electromatic signals, and an antenna array of the reconfigurable intelligent surface. The antenna array harvests electrical energy from the incoming electromatic signals, and respective antennas of the antenna array are coupled to respective energy harvesting contacts. Electrical charging circuitry can include radio frequency (RF) power combiner circuitry coupled to the respective energy harvesting contacts to combine the electrical energy from the respective energy harvesting contacts into combined RF input, and a wide power range rectifier circuit. The wide power range rectifier circuit can include a switch that self-actuates into a closed state at a defined high RF power level, and self-de-actuates into an open state below the defined high RF power level, a circulator, which can include a first input port coupled to the combined RF input, a second output port coupled to the switch, and a third output port coupled to a lower power multistage rectifier. In the closed state, the circulator routes the combined RF input through the switch to a higher power multistage rectifier that outputs first direct current (DC) power to a DC power combiner. In the open state, the circulator routes the combined RF input to the lower power multistage rectifier that outputs second DC power to the DC power combiner. The system further can include an energy storage device coupled to the DC power combiner to charge the energy storage device based on the electrical energy harvested from the respective energy harvesting contacts.

The higher power multistage rectifier can include a first multistage rectifier subcircuit having ten stages, and the lower power multistage rectifier can include a second multistage rectifier subcircuit having seven stages.

The energy storage device can be a first energy storage device, wherein the switch can be a first switch, and the system further can include a controller, and a second switch that is operational in a first state to couple the first energy storage device to the electrical charging circuitry, in conjunction with a second energy storage device providing power to the controller and to respective variable tuning devices of respective unit cells of the reconfigurable intelligent surface, the respective variable tuning devices controllable by the controller to determine at least one of: a shape, a direction, or an amplitude of a redirected instance from the respective unit cells of the impinging RF electromagnetic signal.

The second switch can be operational in a second state to couple the second battery to the electrical charging circuitry, in conjunction with the first battery providing power to the controller and to the respective variable tuning devices of the respective second unit cells.

The energy storage device can include at least one of: a battery, or a capacitor.

Figure 10:
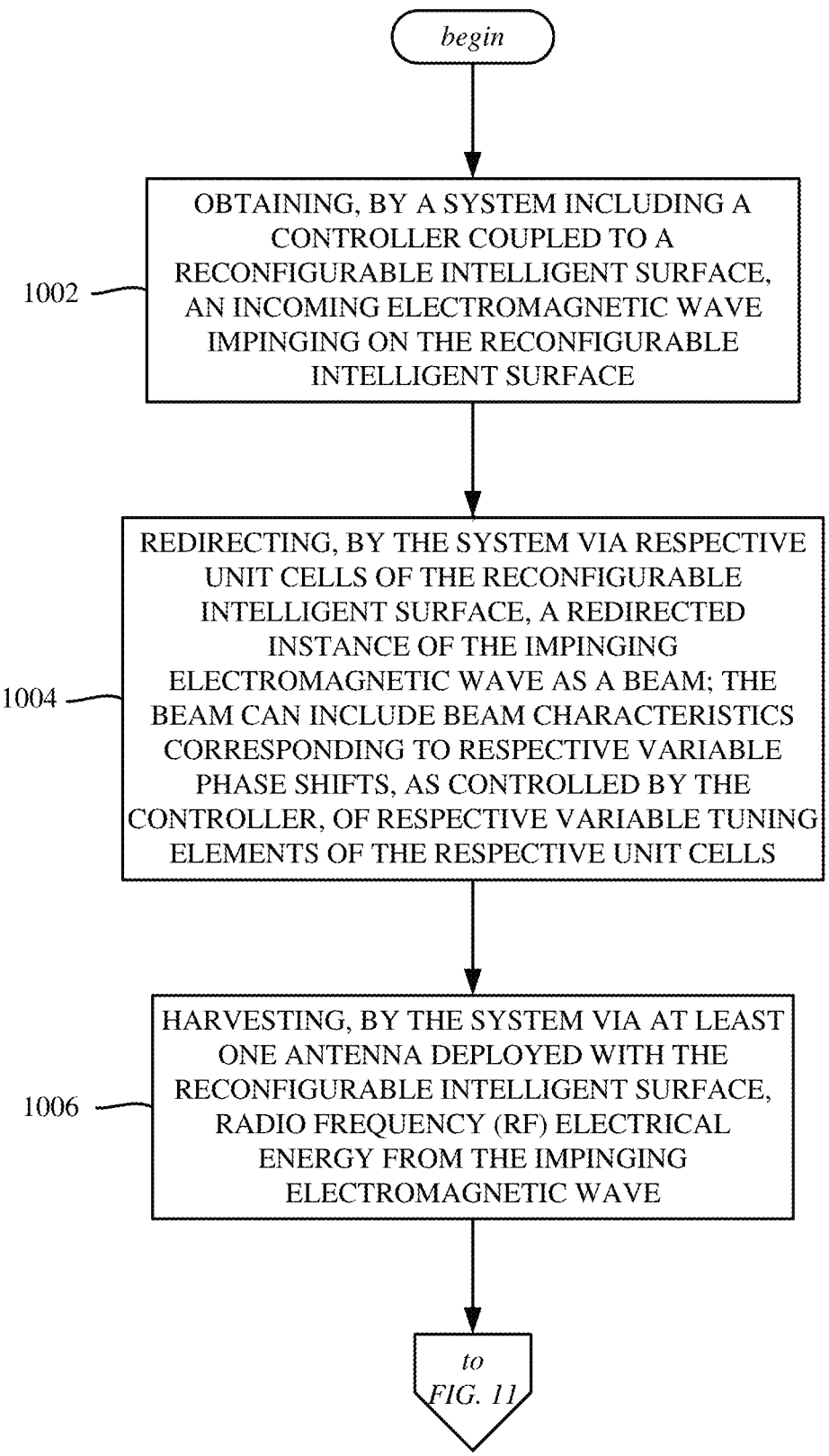
FIGS. 10 and 11 comprise a flow diagram showing example operations related to charging a first battery with combined and rectified harvested energy from at least one energy harvesting antenna, while powering a controller from a second battery to control tuning elements of unit cells, in accordance with various example embodiments and implementations of the subject disclosure.
Figure 11:
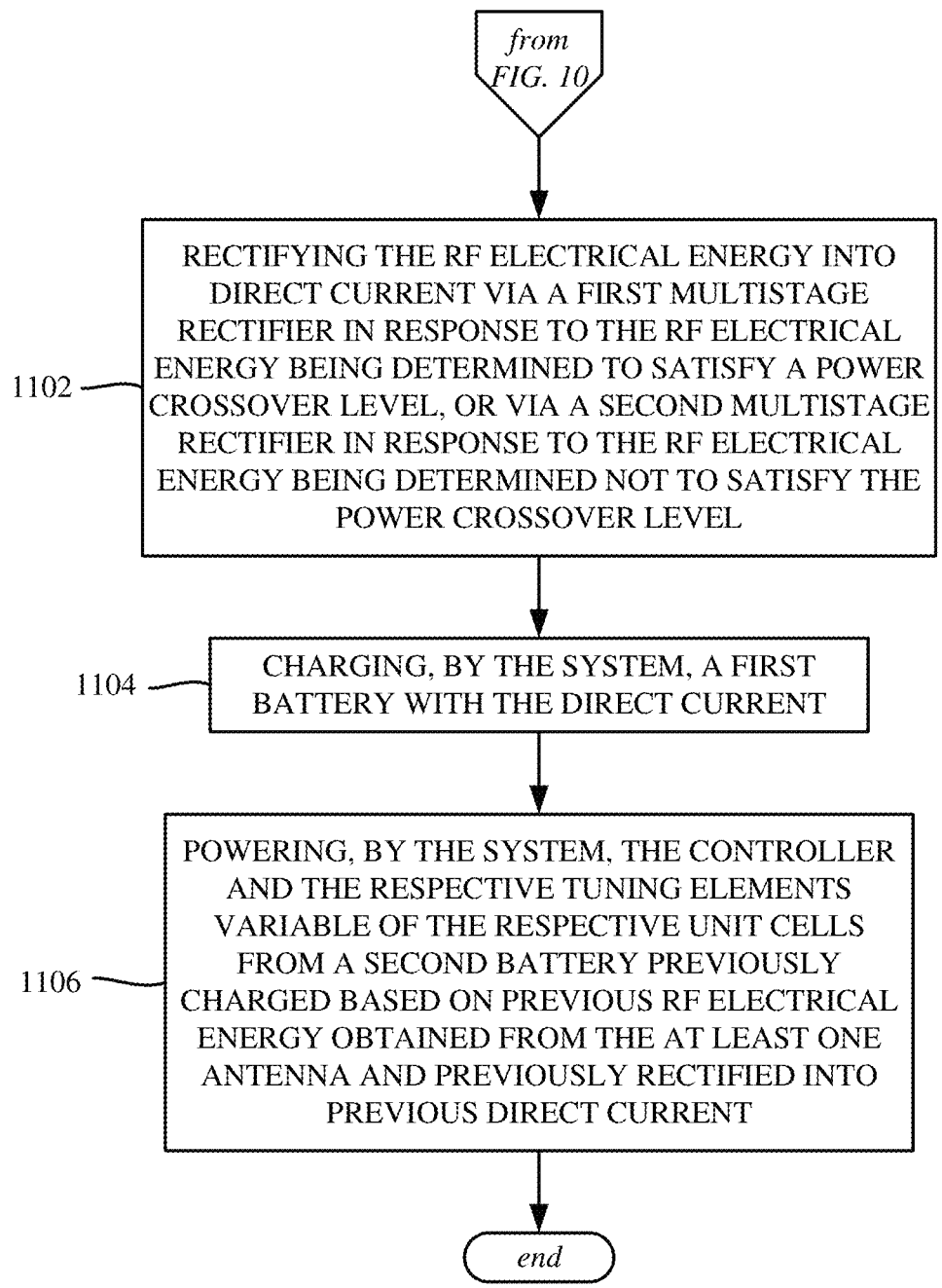

One or more example aspects, such as corresponding to example operations of a method, or a system/a machine-readable medium having executable instructions that, when executed by a processor, facilitate performance of the operations, are represented in FIGS. 10 and 11. Example operation 1002 of FIG. 10 represents obtaining, by a system including a controller coupled to a reconfigurable intelligent surface, an incoming electromagnetic wave impinging on the reconfigurable intelligent surface. Example operation 1004 represents redirecting, by the system via respective unit cells of the reconfigurable intelligent surface, a redirected instance of the impinging electromagnetic wave as a beam, the beam can include beam characteristics corresponding to respective variable phase shifts, as controlled by the controller, of respective variable tuning elements of the respective unit cells. Example operation 1006 represents harvesting, by the system via at least one antenna deployed with the reconfigurable intelligent surface, radio frequency (RF) electrical energy from the impinging electromagnetic wave. The operations continue at FIG. 11, where example operation 1102 represents rectifying the RF electrical energy into direct current via a first multistage rectifier in response to the RF electrical energy being determined to satisfy a power crossover level, or via a second multistage rectifier in response to the RF electrical energy being determined not to satisfy the power crossover level. Example operation 1104 represents charging, by the system, a first battery with the direct current. Example operation 1106 represents powering, by the system, the controller and the respective tuning elements variable of the respective unit cells from a second battery previously charged based on previous RF electrical energy obtained from the at least one antenna and previously rectified into previous direct current.

The at least one antenna can include an antenna array can include at least four respective antennas, and further operations can include combining, by the system, respective electrical energy from respective harvesting contacts coupled to the respective antennas into combined RF electrical energy. Harvesting of the RF electrical energy can include coupling the respective harvesting contacts to at least one RF power combiner that combines the respective electrical energy from the respective harvesting contacts into the combined RF electrical energy.

Further operations can include switching, by the system, to charge the second battery based on the direct current, and to power the controller and respective tuning elements of the respective first unit cells from the first battery, the switching based on at least one of: a first level of charge of the first battery, or a second level of charge of the second battery.

Further operations can include coupling, by the system, the RF electrical energy from a multiport circulator device to the first multistage rectifier via a switch that, in response to the combined RF electrical energy being determined to satisfy the power crossover level, self-actuates to couple the RF electrical energy from the multiport circulator device to the first multistage rectifier.

As can be seen, the technology described herein is directed to a reconfigurable intelligent surface arranged with unit cells designed for signal reflection and antennas used for energy harvesting. The technology results in a mostly or entirely self-sufficient operational model for a reconfigurable intelligent surface, eliminating (or at least substantially reducing) the need for power consumed from an external power source. The technology described herein thus significantly contributes to the advantage of reconfigurable intelligent surface technology's reduced power consumption when compared to traditional active relays.

In one implementation, the antennas designed for energy harvesting harvest the incoming energy, which is combined using an RF combiner, and then provided to an energy harvesting circuit which converts this AC energy into DC energy. This harvested energy is then stored in a battery for meeting the energy needs of the reconfigurable intelligent surface panel, including when used with a double battery approach. Employing a power-dependent switchable multi-mode (low power mode and high power mode) rectifier can significantly improve the system's ability to efficiently harvest energy across a broad range of incoming signal strengths, with a topology designed to ensure high energy conversion efficiency.

In general, because of their ability to achieve lower energy use, reconfigurable intelligent surface-assisted communications are preferable to using active relay systems. The technology described herein is directed to a hardware method/circuit for use with reconfigurable intelligent surface elements, to provide self-sustaining reconfigurable intelligent surface operation through energy harvesting from incoming electromagnetic signals. Such self-sufficiency can be achievable if the reconfigurable intelligent surface's electronic components' average power consumption is on the order of a few microwatts, for example.

For fully self-powered reconfigurable intelligent surfaces, such autonomous functionality can be particularly beneficial in various settings; for instance, in locations where power grids are unavailable or in situations where aesthetic considerations impede the installation of reconfigurable intelligent surfaces on certain structures, like trees. Moreover, aesthetic concerns can make it challenging to obtain permissions for installing external power cables on building exteriors to power the reconfigurable intelligent surfaces. Using large batteries as an energy source is also impractical, as they require ongoing maintenance and frequent replacement.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a reconfigurable intelligent surface that redirects an incoming electromagnetic signal as a redirected electromagnetic signal;
   respective unit cells of the reconfigurable intelligent surface, the respective unit cells comprising respective variable tuning devices that are controllable to determine at least one of: a shape, a direction, or an amplitude of the redirected electromagnetic signal;
   respective power harvesting antennas of the reconfigurable intelligent surface, the respective power harvesting antennas arranged to obtain harvested electrical energy from the incoming electromagnetic signal; and
   electrical charging circuitry coupled between the respective power harvesting antennas and an energy storage device, the electrical charging circuitry configured to convert the harvested electrical energy from the respective power harvesting antennas to direct current that charges the energy storage device.

2. The system of claim 1, wherein the electrical charging circuitry comprises a wide power range rectifier circuit, comprising a power-dependent radio frequency switch that self-actuates at a defined high radio frequency power level, resulting in coupling a first higher power rectifier subcircuit to the harvested electrical energy to output the direct current that charges the energy storage device, and self-de-actuates below the defined high radio frequency power level, resulting in coupling a second lower power rectifier subcircuit to the harvested electrical energy to output the direct current that charges the energy storage device.

3. The system of claim 2, wherein the first higher power rectifier subcircuit comprises a first multistage rectifier subcircuit having an even number of stages, and wherein the second lower power rectifier subcircuit comprises a second multistage rectifier subcircuit having an odd number of stages.

4. The system of claim 2, wherein the harvested electrical energy is combined and coupled to a first port of a multiport circulator device, the multiport circulator device having a second port coupled to the power-dependent radio frequency radio switch used to couple the first higher power rectifier subcircuit to the harvested electrical energy in response to the power-dependent radio frequency radio switch self-actuating, and a third port coupled to the second lower power rectifier subcircuit used to couple the second lower power rectifier subcircuit to the harvested electrical energy in response to the power-dependent radio frequency radio switch self-de-actuating.

5. The system of claim 2, wherein the power-dependent radio frequency switch comprises vanadium dioxide.

6. The system of claim 1, wherein the energy storage device comprises a first battery, and further comprises a second battery, a controller, and a switch that is operational in a first state to couple the first battery to the electrical charging circuitry, in conjunction with the second battery providing power to the controller and to the respective variable tuning devices of the respective first unit cells, the respective variable tuning devices controllable by the controller to determine the at least one of: the shape, the direction, or the amplitude of the redirected electromagnetic signal.

7. The system of claim 6, wherein the switch is operational in a second state to couple the second battery to the electrical charging circuitry, in conjunction with the first battery providing power to the controller and to the respective variable tuning devices of the respective first unit cells.

8. The system of claim 7, further comprising a power management unit that toggles the switch between the first state and the second state based on at least one of: a first level of charge of the first battery, or a second level of charge of the second battery.

9. The system of claim 1, wherein the electrical charging circuitry comprises a radio frequency power combiner comprising inputs electrically coupled to respective electrical contacts of the respective energy harvesting antennas.

10. The system of claim 1, wherein the respective energy harvesting antennas comprise an antenna array of at least four antennas.

11. A system, comprising:
    a reconfigurable intelligent surface of unit cells for redirection of incoming electromatic signals as redirected electromatic signals;
    an antenna array of the reconfigurable intelligent surface, wherein the antenna array harvests electrical energy from the incoming electromatic signals, and wherein respective antennas of the antenna array are coupled to respective energy harvesting contacts;
    electrical charging circuitry, comprising:
    radio frequency (RF) power combiner circuitry coupled to the respective energy harvesting contacts to combine the electrical energy from the respective energy harvesting contacts into combined RF input, and
    a wide power range rectifier circuit, comprising:
    a switch that self-actuates into a closed state at a defined high RF power level, and self-de-actuates into an open state below the defined high RF power level;
    a circulator comprising a first input port coupled to the combined RF input, a second output port coupled to the switch, and a third output port coupled to a lower power multistage rectifier, wherein
    in the closed state, the circulator routes the combined RF input through the switch to a higher power multistage rectifier that outputs first direct current (DC) power to a DC power combiner, and in the open state, the circulator routes the combined RF input to the lower power multistage rectifier that outputs second DC power to the DC power combiner; and an energy storage device coupled to the DC power combiner to charge the energy storage device based on the electrical energy harvested from the respective energy harvesting contacts.

12. The system of claim 11, wherein the higher power multistage rectifier comprises a first multistage rectifier subcircuit having ten stages, and wherein the lower power multistage rectifier comprises a second multistage rectifier subcircuit having seven stages.

13. The system of claim 11, wherein the energy storage device is a first energy storage device, wherein the switch is a first switch, and further comprising a controller, and a second switch that is operational in a first state to couple the first energy storage device to the electrical charging circuitry, in conjunction with a second energy storage device providing power to the controller and to respective variable tuning devices of respective unit cells of the reconfigurable intelligent surface, the respective variable tuning devices controllable by the controller to determine at least one of: a shape, a direction, or an amplitude of a redirected instance from the respective unit cells of the impinging RF electromagnetic signal.

14. The system of claim 13, wherein the second switch is operational in a second state to couple the second battery to the electrical charging circuitry, in conjunction with the first battery providing power to the controller and to the respective variable tuning devices of the respective second unit cells.

15. The system of claim 11, wherein the energy storage device comprises at least one of: a battery, or a capacitor.

16. A method, comprising:

obtaining, by a system comprising a controller coupled to a reconfigurable intelligent surface, an incoming electromagnetic wave impinging on the reconfigurable intelligent surface;

redirecting, by the system via respective unit cells of the reconfigurable intelligent surface, a redirected instance of the impinging electromagnetic wave as a beam, the beam comprising beam characteristics corresponding to respective variable phase shifts, as controlled by the controller, of respective variable tuning elements of the respective unit cells;

harvesting, by the system via at least one antenna deployed with the reconfigurable intelligent surface, radio frequency (RF) electrical energy from the impinging electromagnetic wave;

rectifying the RF electrical energy into direct current via a first multistage rectifier in response to the RF electrical energy being determined to satisfy a power crossover level, or via a second multistage rectifier in response to the RF electrical energy being determined not to satisfy the power crossover level;

charging, by the system, a first battery with the direct current; and powering, by the system, the controller and the respective tuning elements variable of the respective unit cells from a second battery previously charged based on previous RF electrical energy obtained from the at least one antenna and previously rectified into previous direct current.

17. The method of claim 16, wherein the at least one antenna comprises an antenna array comprising at least four respective antennas, and further comprising combining, by the system, respective electrical energy from respective harvesting contacts coupled to the respective antennas into combined RF electrical energy.

18. The method of claim 17, wherein the harvesting of the RF electrical energy comprises coupling the respective harvesting contacts to at least one RF power combiner that combines the respective electrical energy from the respective harvesting contacts into the combined RF electrical energy.

19. The method of claim 16, further comprising switching, by the system, to charge the second battery based on the direct current, and to power the controller and respective tuning elements of the respective first unit cells from the first battery, the switching based on at least one of: a first level of charge of the first battery, or a second level of charge of the second battery.

20. The method of claim 16, further comprising coupling, by the system, the RF electrical energy from a multiport circulator device to the first multistage rectifier via a switch that, in response to the combined RF electrical energy being determined to satisfy the power crossover level, self-actuates to couple the RF electrical energy from the multiport circulator device to the first multistage rectifier.

* * * * *